(12) United States Patent
Cho

(10) Patent No.: US 7,762,576 B2
(45) Date of Patent: Jul. 27, 2010

(54) STRUCTURE OF DRIVER'S AIRBAG CUSHION OF VEHICLE

(75) Inventor: Youngnam Cho, Suwon-si (KR)

(73) Assignee: Hyundai Motor Company (KR)

( * ) Notice: Subject to any disclaimer, the term of this patent is extended or adjusted under 35 U.S.C. 154(b) by 0 days.

(21) Appl. No.: 12/324,379

(22) Filed: Nov. 26, 2008

(65) Prior Publication Data

US 2009/0152845 A1 Jun. 18, 2009

(30) Foreign Application Priority Data

Dec. 14, 2007 (KR) ...................... 10-2007-0130876

(51) Int. Cl.
*B60R 21/233* (2006.01)
*B60R 21/26* (2006.01)

(52) U.S. Cl. ..................... 280/729; 280/742; 280/743.2

(58) Field of Classification Search ................. 280/729, 280/730.1, 743.1, 743.2
See application file for complete search history.

(56) References Cited

U.S. PATENT DOCUMENTS

| 4,932,285 | A | * | 6/1990 | Tsukamoto | ................... 74/552 |
| 5,945,184 | A | * | 8/1999 | Nagata et al. | .............. 428/35.2 |
| 6,572,144 | B2 | * | 6/2003 | Igawa | ..................... 280/743.1 |
| 6,786,505 | B2 | * | 9/2004 | Yoshida | ...................... 280/729 |
| 6,893,044 | B2 | * | 5/2005 | Holmes et al. | .............. 280/731 |
| 7,000,947 | B2 | * | 2/2006 | Kumagai et al. | ......... 280/743.1 |
| 7,066,487 | B2 | | 6/2006 | Sullivan et al. | |
| 7,134,691 | B2 | * | 11/2006 | Dunkle et al. | ............ 280/743.2 |
| 2002/0175511 | A1 | | 11/2002 | Dunkle et al. | |
| 2006/0192371 | A1 | * | 8/2006 | Abe | .......................... 280/739 |

FOREIGN PATENT DOCUMENTS

JP 2004 148925 A 5/2004
JP 2006 069384 A 3/2006

* cited by examiner

*Primary Examiner*—Paul N Dickson
*Assistant Examiner*—Joseph Rocca
(74) *Attorney, Agent, or Firm*—Morgan, Lewis & Bockius LLP

(57) ABSTRACT

A structure for a driver's airbag cushion of a vehicle is provided to protect the driver's lower body as well as the driver's upper body and head, without mounting a knee airbag at the lower portion of the crash pad. The structure may include a blocking member that extends from a rear upper end of an airbag cushion to a front end of the airbag cushion and divides the interior of the airbag cushion into a face chamber defined by a front upper space of the airbag cushion and a pelvis chamber defined by a lower space thereof, the blocking member blocks the face and pelvis chambers, a temporary blocking member provided at a predetermined portion of the blocking member to control fluid-communication between the face chamber and the pelvis chamber when a tensile force is applied thereto, and/or a tensile force-providing member that applies tensile force to the temporary blocking member so that the pelvis chamber may be communicated with the face chamber by releasing the temporary blocking member when the pelvis chamber substantially expands.

12 Claims, 4 Drawing Sheets

STRUCTURE OF DRIVER'S AIRBAG CUSHION OF VEHICLE

CROSS-REFERENCE TO RELATED APPLICATION

The present application is based on, and claims priority to Korean Patent Application Number 10-2007-0130876, filed on Dec. 14, 2007, the entire contents of which is hereby incorporated herein for all purposes by this reference herein.

BACKGROUND OF THE INVENTION

1. Field of the Invention

The present invention relates to an structure for a driver's airbag cushion of a vehicle, particularly a technology that can protect all of the upper body and the lower body of a driver by providing a function that holds the driver's pelvis using simple structure and configuration.

2. Description of Related Art

The driver's airbag is mounted at the center of the steering wheel in the related art so that an airbag cushion protects mainly the driver's upper body and head in an accident.

Further, when a knee airbag is mounted in the crash pad, an airbag cushion of the knee airbag protects the driver's lower body in a car collision, inflating between the driver's lower body, such as knee, and the crush pad.

However, when a knee airbag is mounted in a vehicle as described above, in addition to increasing the cost of the vehicle, the weight of the vehicle is increased by the weight of the knee airbag itself, thereby decreasing the fuel efficiency of the vehicle. Further, because a space for the knee airbag is needed at the lower portion of the crush pad, a passenger feels inconvenience when sitting on the seat or getting in/out of the vehicle and it takes more time and efforts to mount the knee airbag.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide for a structure of a driver's airbag cushion of a vehicle that can protect the driver's lower body as well as the driver's upper body and head, without mounting a knee airbag at the lower portion of the crash pad, such that it is possible to reduce the cost of the vehicle, improve the fuel efficiency of the vehicle by reducing the weight, and remove inconvenience when a passenger is sitting on the seat or gets in/out of the vehicle.

Various aspects of the present invention are directed to a structure for a driver's airbag cushion of a vehicle including a blocking member that extends from a rear upper end of an airbag cushion to a front end of the airbag cushion and divides the interior of the airbag cushion into a face chamber defined by a front upper space of the airbag cushion and a pelvis chamber defined by a lower space thereof, the blocking member blocks the face and pelvis chambers, a temporary blocking member provided at a predetermined portion of the blocking member to control fluid-communication between the face chamber and the pelvis chamber when a tensile force is applied thereto, and/or a tensile force-providing member that applies tensile force to the temporary blocking member so that the pelvis chamber may be communicated with the face chamber by releasing the temporary blocking member when the pelvis chamber substantially expands.

The pelvis chamber may be configured to receive inflation gas. The temporary blocking member may include a tearing portion formed at a predetermined portion of the blocking member and that capable of being torn along a cutting line by the applied tensile force, and the tensile force-providing member may include a link tether having an end sewn to the tearing portion of the temporary blocking member and the other end sewn to the inside of the airbag cushion that pertains to the pelvis chamber. The pelvis chamber may be dimensioned and configured to prevent a driver's pelvis and lower body from moving toward front of the vehicle as the pelvis chamber fully expands. The face chamber may be dimensioned and configured to prevent a driver's head and upper body from moving toward front of the vehicle as the face chamber fully expands.

The airbag cushion may include two right-angled triangular side panels that each have a right-angled corner facing the front upper side and two acute-angled corners each facing the front lower side and the rear upper side respectively; and a front panel that may be connected with two side panels along the outlines of the side panels to seal a space between the side panels. The vent hole that opens to the exterior may be formed at the face chamber of the airbag cushion. The airbag cushion may be mounted in a non-rotating mount such that the airbag cushion does not rotate even though a steering wheel turns.

The airbag cushion may include a pelvis cushion that forms the pelvis chamber, and a face cushion that is connected to an upper portion of the pelvis cushion to define the face chamber together with the upper portion of the pelvis cushion. The blocking member may be formed of the upper portion of pelvis cushion that defines the face chamber together with the face cushion. The temporary blocking member may have a cut hole formed through a portion of the upper portion of the pelvis cushion and a blocker panel sewn to temporarily close the cut hole. The tensile force-providing member may include a connecting tether having an end sewn to the blocker panel and the other end sewn to an interior of the pelvis cushion.

A vent hole that opens to the exterior may be formed at the face chamber of the airbag cushion. The airbag cushion may be mounted in a non-rotating mount such that the airbag cushion does not rotate even though a steering wheel turns.

A steering wheel assembly may include any of the above-mentioned structures for the driver's airbag cushion of the vehicle. A passenger vehicle may include the above-mentioned steering wheel assembly.

According to other aspects of the present invention, it is possible to protect the driver's lower body as well as the driver's upper body and head, without mounting a knee airbag at the lower portion of the crash pad. Further, it is possible to reduce the cost of the vehicle, improve the fuel efficiency of the vehicle by reducing the weight, and remove inconvenience when a passenger is sitting on the seat or gets in/out of the vehicle because it is not needed to secure a space for a knee airbag as in the related art.

The methods and structures of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
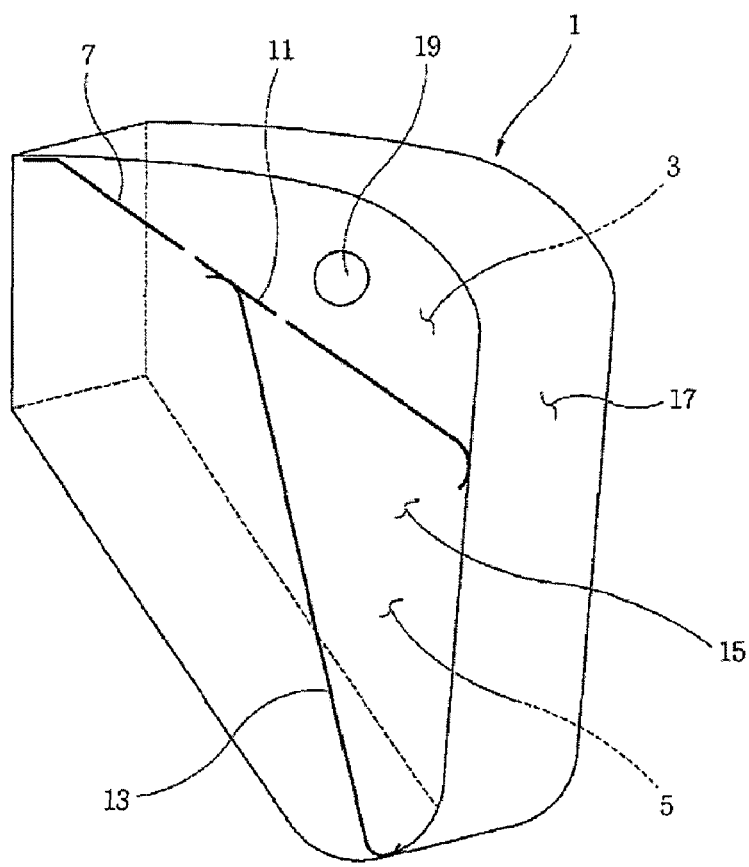
FIG. 1 is a view showing an exemplary structure of a driver's airbag cushion of a vehicle according to a various aspects of the present invention.
Figure 4:
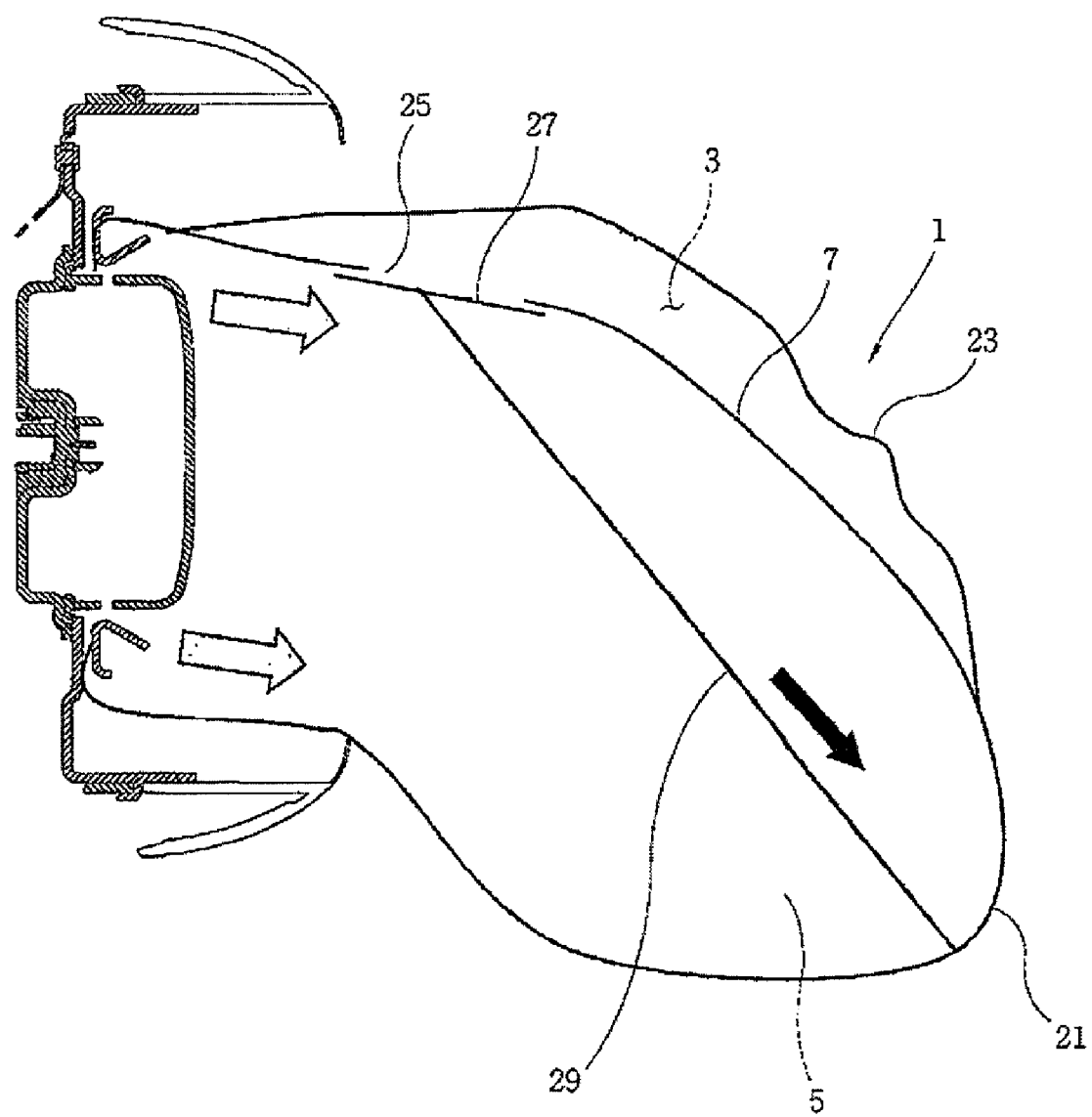
FIG. 4 is a view showing an exemplary structure of a driver's airbag cushion of a vehicle according to other aspects of the present invention.

Referring to FIGS. 1 and 4, an structure for a driver's airbag cushion of a vehicle according to embodiments of the invention includes: a blocking member 7 that extends from the rear upper end of an airbag cushion 1 to the front in the airbag cushion 1, assuming that the front direction is a direction in which airbag cushion 1 expands from the steering wheel to a driver, divides the inside of airbag cushion 1 into a face chamber 3 that is the upper space of airbag cushion 1 and a pelvis chamber 5 that is the lower space, and blocks the chambers; a temporary blocking member that is provided at a predetermined portion of blocking member 7 to communicate face chamber 3 with pelvis chamber 5 when a tensile force is applied; and a tensile force-providing member that applies a tensile force to the temporary blocking member so that pelvis chamber 5 is communicated with face chamber 3 through the temporary blocking member when expansion of pelvis chamber 5 is substantially completed.

That is, inflation gas generated by an otherwise conventional inflator is supplied to airbag cushion 1 only through pelvis chamber 5 and then flows into face chamber 3 through a channel formed when the temporary blocking member is released from the predetermined portion of the blocking member 7 by the tensile force-providing member while pelvis chamber 5 almost expands, such that face chamber 3 starts to expand when the expansion of pelvis chamber 5 is almost completed.

Pelvis chamber 5 expands earlier than face chamber 3 and thereby prevents the driver's lower body from moving forward and hitting against the crush pad by holding the driver's pelvis at the earlier state of a vehicle collision, causing the driver's upper body to turn forwards, such that face chamber 3 expands and protects the driver's upper body and head.

Therefore, it is preferable to mount airbag cushion 1 in a non-turning type such that airbag cushion 1 does not rotate even though the steering wheel turns.

Figure 2:
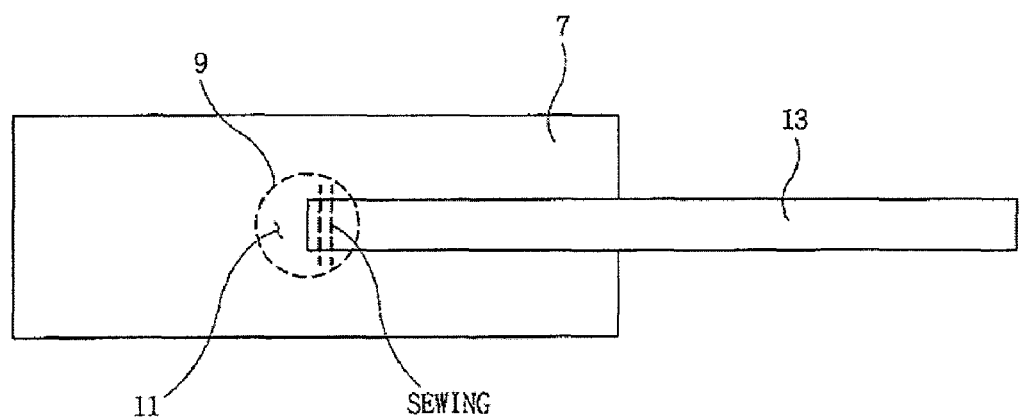
FIG. 2 is a view showing the connecting portion of a blocking member and a link tether shown in FIG. 1.
Figure 3:
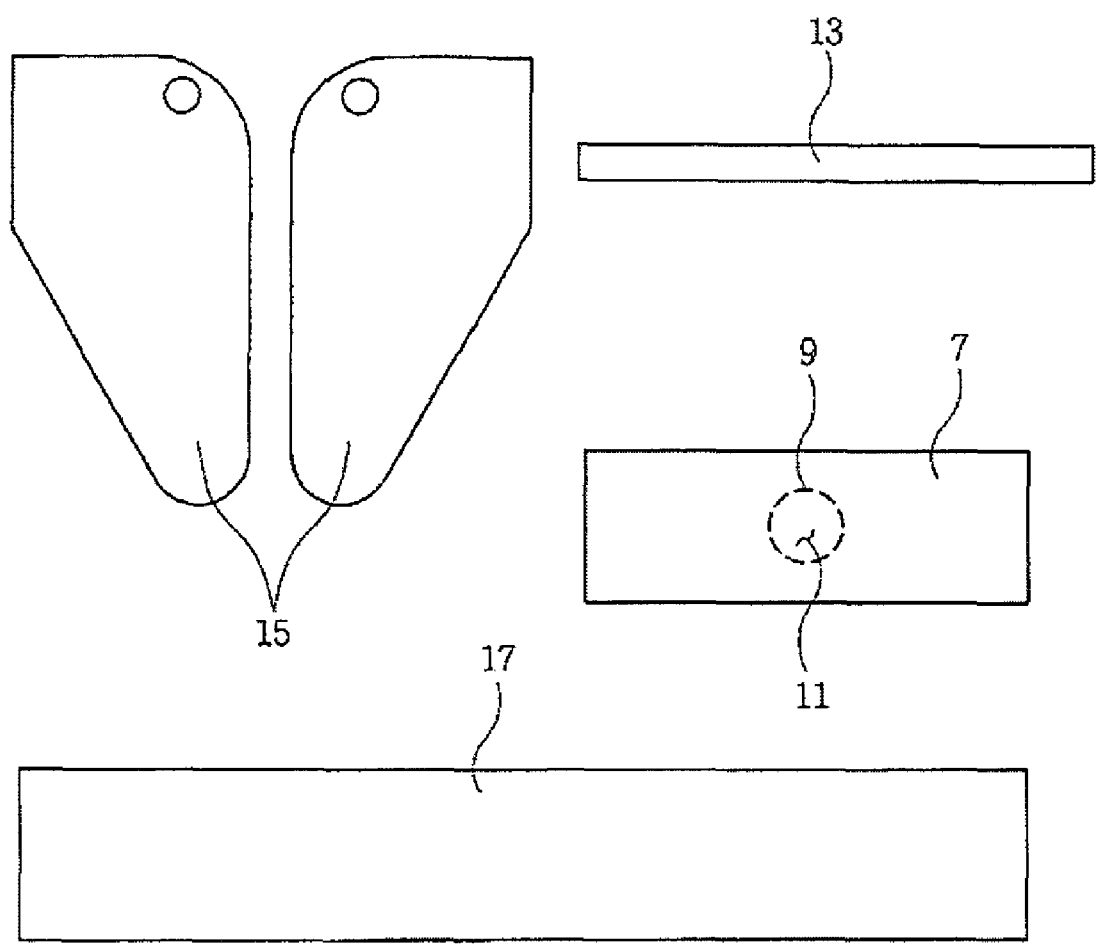
FIG. 3 is a development view of parts of the airbag cushion shown in FIG. 1.

FIGS. 1 to 3 show a first embodiment of the invention, in which the temporary blocking member is a tearing portion 11 temporally blocking gas communication between pelvis chamber 5 and face chamber 3 but torn along a cutting line 9 formed at a predetermined portion of blocking member 7 after pelvis chamber 5 expands.

The tensile force-providing member is a link tether 13 having an end sewn to tearing portion 11 and the other end sewn to the inside of airbag cushion 1 pertaining to pelvis chamber 5.

Airbag cushion 1 includes two right-angled triangular side panels 15 that each have a right-angled corner facing the front upper side and two acute-angled corners each facing the front lower side and the rear upper side, and a front panel 17 that is connected with two side panels 15 along the outlines of two side panels 15 to seal a space between side panels 15 as shown in FIG. 1.

Therefore, airbag cushion 1 according to this embodiment is completed by sewing link tether 13 to tearing portion 11 of blocking member 7, connecting blocking member 7 and link tether 13 to front panel 17 respectively, and then connecting side panels 15 to both sides of front panel 17.

According to airbag cushion 1 having the above configuration, inflation gas generated from inflator is supplied only into pelvis chamber 5 at the earlier expansion in a vehicle collision, such that link tether 13 applies a tensile force to tearing portion 11 formed on the blocking member 7 after expansion of pelvis chamber 5 is almost completed.

Therefore, pelvis chamber 5 holds the driver's pelvis at the earlier expansion, rapidly expanding mainly downward, such that the driver's pelvis and lower body is prevented from moving toward the front of the vehicle.

For this reason, the driver's upper body turns forward and tearing portion 11 is opened, such that the inflation gas flows from pelvis chamber 5 into face chamber 3, thereby absorbing the shock that is applied to the driver's upper body and head.

Accordingly, airbag cushion 1 according to this embodiment can effectively protect the driver's lower body as well as the upper body and head, without a knee airbag.

Further, it is preferable to form at least a vent hole 19 that is open to the outside only at face chamber 3 of airbag cushion 1 to rapidly expand pelvis chamber 5 and obtain the highest shock-absorbing effect for the driver hitting against face chamber 3.

Figure 5:
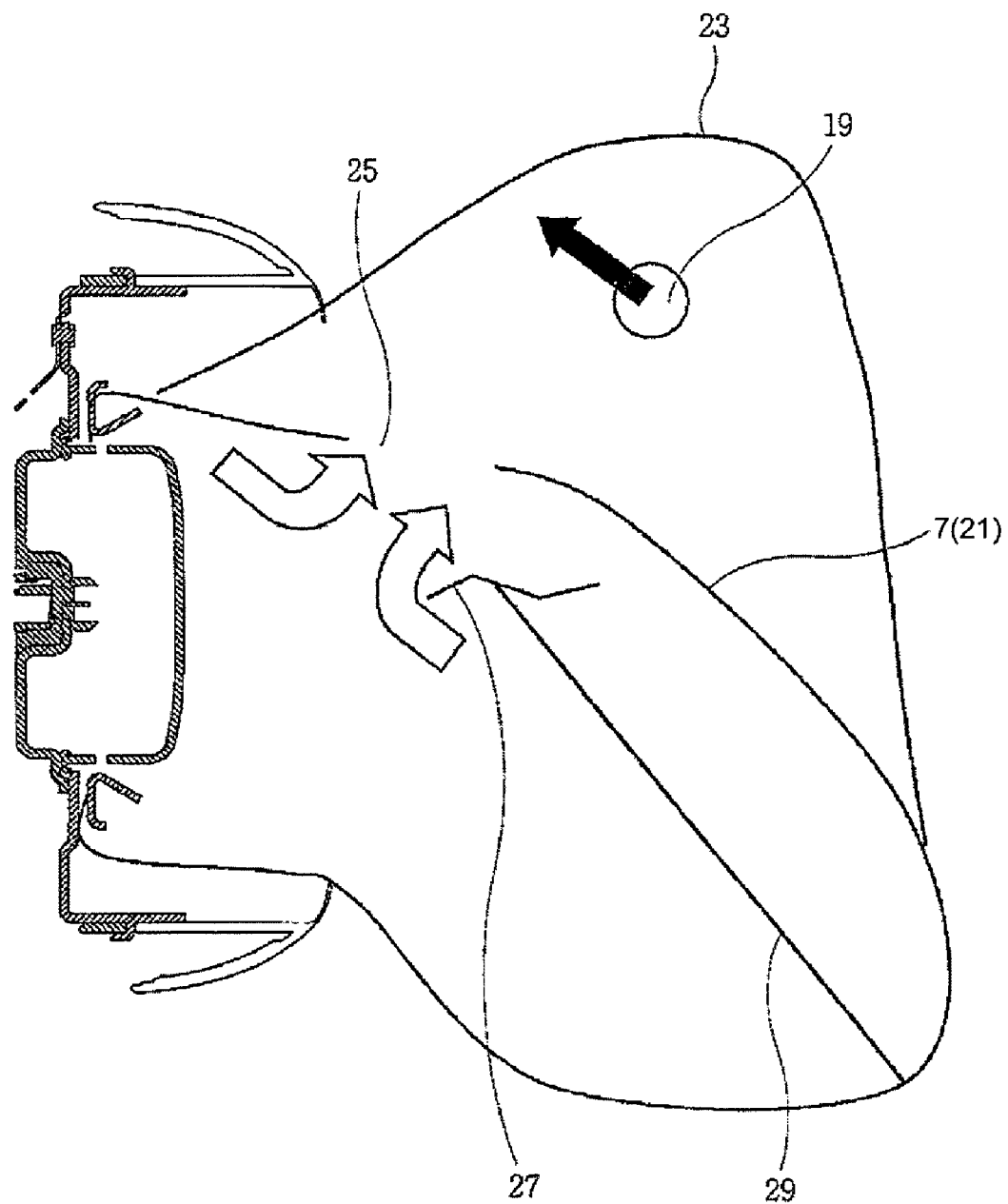
FIG. 5 is a view illustrating expansion of the airbag cushion shown in FIG. 4.

On the other hand, FIGS. 4 and 5 show another exemplary embodiment in accordance with various aspects of the present invention. Referring to FIGS. 4 and 5, airbag cushion 1 includes a pelvis cushion 21 that forms pelvis chamber 5 and a face cushion 23 connected to the upper portion of pelvis cushion 21 to form face chamber 3 together with the upper surface of pelvis cushion 21.

Blocking member 7 is formed of the upper surface of pelvis cushion 21 that forms face chamber 3 together with face cushion 23. The temporary blocking member has a cut hole 25 formed through the upper surface of pelvis cushion 21 and a blocker panel 27 sewn to temporarily close cut hole 25. The tensile force-providing member is a connecting tether 29 having an end sewn to blocker panel 27 and the other end sewn to the inside of pelvis cushion 21.

A vent hole 19 may be formed on the face cushion 23 and is open to the outside of the airbag cushion.

This embodiment is different from the first embodiment in structure, such as the connecting method and integration of components for each part of airbag cushion 1, but connecting tether 29 substantially corresponds to link tether 13 and blocker panel 27 corresponds to tearing portion 11.

The operation of this embodiment is also the same as that of the first embodiment and FIG. 5 shows the flow of the inflation gas into face chamber 3 after pelvis chamber 5 completely expands, instead of describing the detailed operation.

According to airbag cushion 1 described above; it is not necessary to secure a space for mounting a knee airbag at the lower portion of the crush pad as in the related art, such that a passenger can comfortably sit on the seat to get in/out of the vehicle.

For convenience in explanation and accurate definition in the appended claims, the terms "upper", "lower", "front", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A structure for a driver's airbag cushion of a vehicle comprising:
    a blocking member that extends from a rear upper end of an airbag cushion to a front end of the airbag cushion and divides the interior of the airbag cushion into a face chamber defined by a front upper space of the airbag cushion and a pelvis chamber defined by a lower space thereof, the blocking member blocks the face and pelvis chambers;
    a temporary blocking member provided at a predetermined portion of the blocking member to control fluid-communication between the face chamber and the pelvis chamber when a tensile force is applied thereto; and
    a tensile force-providing member that applies tensile force to the temporary blocking member so that the pelvis chamber is communicated with the face chamber by releasing the temporary blocking member when the pelvis chamber substantially expands;
    wherein the temporary blocking member includes a tearing portion formed at a predetermined portion of the blocking member and that is capable of being torn along a cutting line by the applied tensile force; and
    wherein the tensile force-providing member includes a link tether having an end sewn to the tearing portion of the temporary blocking member and the other end sewn to a front-lower inside corner of the inside of the airbag cushion that pertains to the pelvis chamber.

2. The structure as defined in claim 1, wherein the pelvis chamber is configured to receive inflation gas.

3. The structure as defined in claim 1, wherein the pelvis chamber is dimensioned and configured to prevent a driver's pelvis and lower body from moving toward front of the vehicle as the pelvis chamber fully expands.

4. The structure as defined in claim 1, wherein the face chamber is dimensioned and configured to resist a driver's head and upper body from moving toward front of the vehicle as the face chamber fully expands.

5. The structure as defined in claim 1, wherein the airbag cushion includes:
    two right-angled triangular side panels that each have a right-angled corner facing the front upper side and two acute-angled corners each facing the front lower side and the rear upper side respectively; and
    a front panel that is connected with two side panels along the outlines of the side panels to seal a space between the side panels.

6. The structure as defined in claim 5, wherein a vent hole that opens to the exterior is formed at the face chamber of the airbag cushion.

7. The structure as defined in claim 1, wherein the airbag cushion is mounted in a non-rotating mount such that the airbag cushion does not rotate even though a steering wheel turns.

8. The structure as defined in claim 1, wherein the airbag cushion includes:
    a pelvis cushion that forms the pelvis chamber; and
    a face cushion that is connected to an upper portion of the pelvis cushion to define the face chamber together with the upper portion of the pelvis cushion,
    wherein the blocking member is formed of the upper portion of pelvis cushion that defines the face chamber together with the face cushion,
    the temporary blocking member has a cut hole formed through a portion of the upper portion of the pelvis cushion and a blocker panel sewn to temporarily close the cut hole, and
    the tensile force-providing member including a connecting tether having an end sewn to the blocker panel and the other end sewn to an interior of the pelvis cushion.

9. The structure as defined in claim 8, wherein a vent hole that opens to the exterior is formed at the face chamber of the airbag cushion.

10. The structure as defined in claim 8, wherein the airbag cushion is mounted in a non-rotating mount such that the airbag cushion does not rotate even though a steering wheel turns.

11. A steering wheel assembly comprising the structure for the driver's airbag cushion of the vehicle as defined in claim 1.

12. A passenger vehicle comprising the steering wheel assembly as defined in claim 11.

* * * * *